US012436850B2

(12) United States Patent
Shepard et al.

(10) Patent No.: US 12,436,850 B2
(45) Date of Patent: Oct. 7, 2025

(54) DATA CONSISTENT FREEZE OF PEER-TO-PEER REMOTE COPY IN A MULTIPLE COMPUTING CLUSTER ENVIRONMENT

(71) Applicant: INTERNATIONAL BUSINESS MACHINES CORPORATION, Armonk, NY (US)

(72) Inventors: William C. Shepard, Hyde Park, NY (US); Tabor R. Powelson, Poughkeepsie, NY (US); Tri M. Hoang, Poughkeepsie, NY (US); Dale F Riedy, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 12 days.

(21) Appl. No.: 18/599,984

(22) Filed: Mar. 8, 2024

(65) Prior Publication Data

US 2025/0284601 A1    Sep. 11, 2025

(51) Int. Cl.
*G06F 11/16*    (2006.01)
*G06F 11/20*    (2006.01)

(52) U.S. Cl.
CPC ...... *G06F 11/1662* (2013.01); *G06F 11/2094* (2013.01); *G06F 2201/805* (2013.01)

(58) Field of Classification Search
CPC ... G06F 11/1446–1469; G06F 11/1662; G06F 11/2053–2097
See application file for complete search history.

(56) References Cited

U.S. PATENT DOCUMENTS

| | | | |
|---|---|---|---|
| 8,209,282 B2 | 6/2012 | Kern et al. | |
| 9,298,567 B2 | 3/2016 | Blea et al. | |
| 9,697,088 B2 | 7/2017 | Mam et al. | |
| 10,705,927 B2 | 7/2020 | Killamsetti et al. | |
| 11,675,675 B1 | 6/2023 | Bissmeyer | |
| 2011/0082951 A1* | 4/2011 | Hardy | G06F 11/201 710/38 |
| 2013/0166863 A1* | 6/2013 | Buragohain | G06F 11/1482 711/E12.103 |
| 2015/0317224 A1* | 11/2015 | Cho | G06F 3/0619 714/6.3 |
| 2020/0081806 A1* | 3/2020 | Brown | G06F 3/067 |

FOREIGN PATENT DOCUMENTS

CN    114116132 A    3/2022

* cited by examiner

*Primary Examiner* — Michael Maskulinski
(74) *Attorney, Agent, or Firm* — Onyx IP Group

(57) ABSTRACT

Data consistent freeze of peer-to-peer remote copy in a multiple computing cluster environment includes freezing, by each of a first computing cluster and a second computing cluster, non-shared logical volumes of the first computing cluster and the second computing cluster; freezing, by each of the first computing cluster and the second computing cluster, shared logical volumes of the first computing cluster and the second computing cluster, wherein a key logical volume is a last shared logical volume to be frozen; selecting one of the first computing cluster and the second computing cluster to perform thaws of the shared logical volumes based on which of the first computing cluster or the second computing cluster was the last to freeze the key logical volume; and thawing, by the selected one of the first computing cluster and the second computing cluster, the shared logical volumes.

20 Claims, 8 Drawing Sheets

DATA CONSISTENT FREEZE OF PEER-TO-PEER REMOTE COPY IN A MULTIPLE COMPUTING CLUSTER ENVIRONMENT

BACKGROUND

The present disclosure relates to methods, apparatus, and products for data consistent freeze of peer-to-peer remote copy in a multiple computing cluster environment.

SUMMARY

According to embodiments of the present disclosure, various methods, apparatus and products for data consistent freeze of peer-to-peer remote copy in a multiple computing cluster environment are described herein. In some aspects, data consistent freeze of peer-to-peer remote copy in a multiple computing cluster environment includes freezing, by each of a first computing cluster and a second computing cluster, non-shared logical volumes of the first computing cluster and the second computing cluster. Each of the first computing cluster and the second computing cluster freezes all shared logical volumes of the first computing cluster and the second computing cluster. A key logical volume is a last shared logical volume to be frozen of a set of peer-to-peer remote copy source volumes of the shared logical volumes. One of the first computing cluster and the second computing cluster is selected to perform thaws of the shared logical volumes based on which of the first computing cluster or the second computing cluster was the last to freeze the key logical volume. The selected one of the first computing cluster and the second computing cluster thaws the shared logical volumes.

In other aspects, data consistent freeze of peer-to-peer remote copy in a multiple computing cluster environment includes registering a path group, by each of a plurality of computing clusters, with one or more shared peer-to-peer remote copy target logical volumes of one or more storage devices. Each of the plurality of computing clusters freezes non-shared logical volumes of the one or more storage devices. Each of the plurality of computing clusters freezes the shared peer-to-peer remote copy logical volumes. Disbanding the path group registered with the one or more shared peer-to-peer remote copy target logical volumes is initiated by each of the plurality of computing clusters. A key logical volume is a last shared target volume to have its path groups disbanded of the shared peer-to-peer remote copy logical volumes. One of the plurality of computing clusters is selected to perform thaws of the shared peer-to-peer remote copy logical volumes based on which of plurality of computing clusters was the last computing cluster to disband its respective path group with the key logical volume. The selected one of the plurality of computing clusters thaws the shared peer-to-peer remote copy logical volumes.

DETAILED DESCRIPTION

Figure 1:
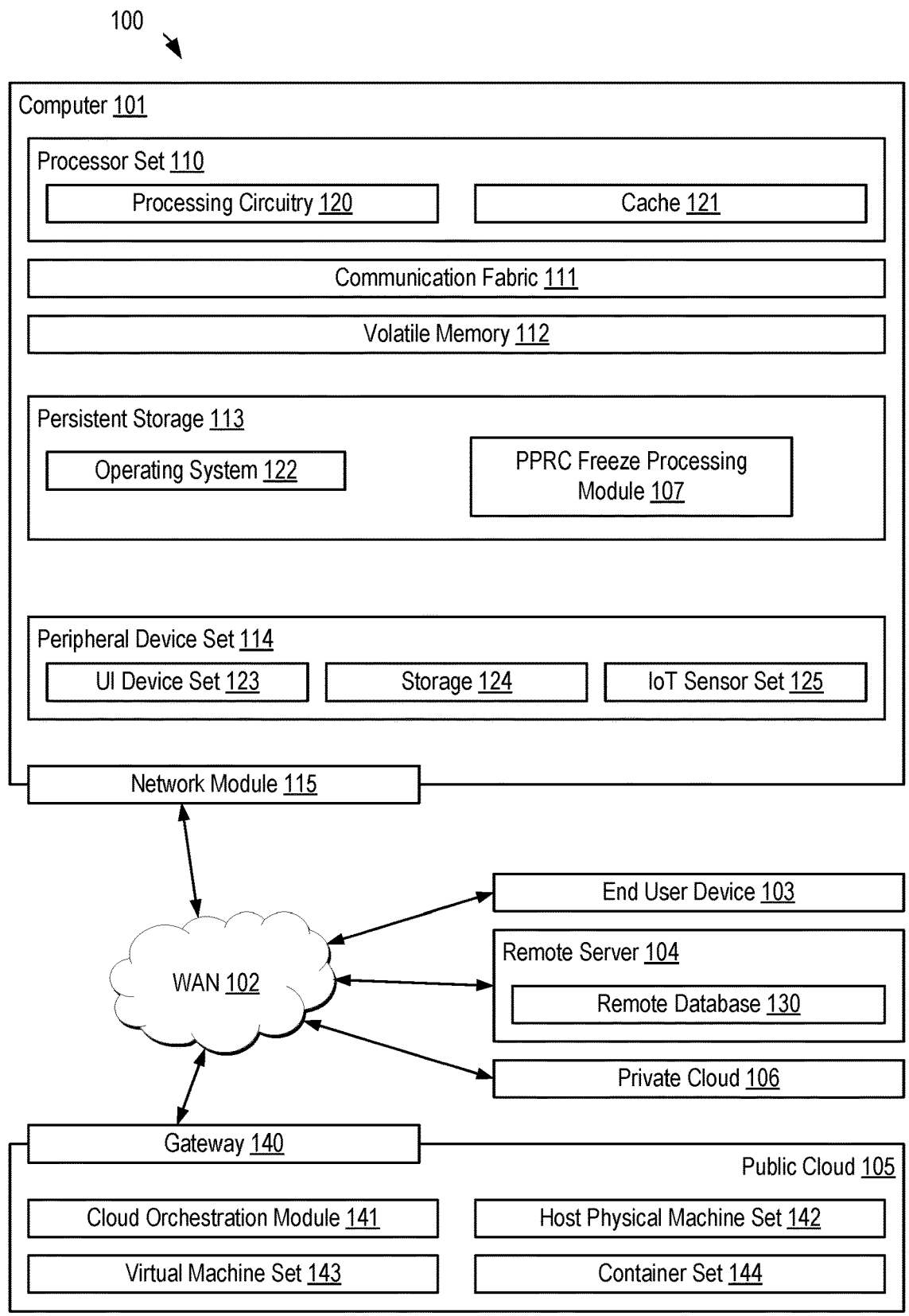
FIG. 1 sets forth an example computing environment according to aspects of the present disclosure.

A computing system is often in communication over a network with one or more storage systems for storing and accessing data used during operation of the computing system. The different storage systems are often located in different geographical locations. Each storage system typically includes one or more storage devices (e.g., disk drives) controlled by a storage controller. Storage replication allows for maintaining redundant copies of data on two different storage systems to allow for continuous availability in the event of a failure of one of the storage systems. Switching from usage of one storage system to another storage system is often referred to as a swap event. The switching from one storage system to another storage system in the event of a failure of the storage system is often referred to as an unplanned swap event. An example of an operating system including such swap capability is the HyperSwap function provided by the z/OS operating system offered by International Business Machines™. A sysplex refers to a computing cluster of independent instances of an operating system. The HyperSwap function provides for continuous availability in the event of disk failures by maintaining synchronous copies of all primary disk volumes on one or more secondary storage controllers. During data replication, data is copied from a source volume to one or more target volumes. The source volume and target volumes that contain copies of the same data are collectively referred to as a copy set. Disk failures can be hidden from applications by the HyperSwap function automatically swapping form one set of disk volumes to another as a result of triggering a swap event.

Peer-to-peer remote copy (PPRC) is a protocol used to replicate a primary storage volume to a secondary storage volume. The primary storage volume and secondary storage volume are often connected together through a communication link called a PPRC path. To facilitate configuration of storage devices, a storage device partitions its possible logical volumes into groups of volumes. Each group of volumes is referred to as a logical subsystem (LSS). An LSS is uniquely identified within the storage system by an LSS identifier that typically is a numerical value. To establish remote mirror and copy pairs, a logical path is established between the associated LSS pair. During a copy operation, subsequent I/O activity is held, referred to as "frozen", as each volume is copied to the target volume. The process of suspending I/O operation is referred to as a "freeze". A frozen volume remains in what is referred to as a "long busy state" until a "thaw" command is processed on the LSS where the volume resides or a timer expires. When all volume copy operations have completed, the thaw command allows I/O activity to resume on the frozen volumes, referred to as "thawing" the volumes residing in the logical subsystems.

To provide for swap functionality to recover from site failures, the ability to perform consistent freeze of all copysets in a configuration is important. It is key for data consistency that all freezes are performed to all storage devices used by a given computing cluster (e.g., a sysplex) before performing any thaws. For example, if a second sysplex starts thawing pairs before the first sysplex completes its freezes, a mix of mirrored and unmirrored writes on the first sysplex may occur, leading to potential data inconsistency in the secondary storage devices. This is difficult in a multi-cluster environment, such as z/OS HyperSwap, where the two computing clusters do not communicate with each other. The time between the first freeze and the last thaw is referred to as the User Impact Time (UIT), and represents how long applications could have potentially been delayed due to the consistent freeze processing.

A need exists for a method for performing consistent freeze across multiple computing clusters while minimizing UIT. Existing methods require each computing cluster to wait a predetermined amount of time (e.g., three seconds) after performing all of the freezes before performing the thaws. However, existing methods produce at least two significant downsides. One downside is that the predetermined time of waiting for the freezes to complete is usually too long and extends UIT longer than necessary. Another downside is if one of the computing clusters is delayed, the predetermined time may not be long enough, causing the shared storage devices to not be time consistent.

One or more embodiments provide for a method of consistently freezing two independent PPRC configurations across multiple computing clusters (e.g., sysplexes) that have shared storage devices. Various embodiments allow the multiple computing cluster configurations to each create a consistent set of PPRC secondary devices while minimizing UIT. Swap operations (e.g., HyperSwap) on each system can continue to operate independently. In particular embodiments when loading a replication configuration, a computing cluster uses a query host access command to find devices shared outside of the computing cluster, and track each shared pair. Each computing cluster utilizes the same shared LSS as a designated key LSS. In particular embodiments, the designated LSS is determined by finding the LSS having a numerically minimum identifier such as the numerically minimum token Node Element Descriptor (NED). A NED is a 32-byte field that describes a node element of an I/O resource and is associated with a physical control unit or device.

In one or more embodiments, when a suspension event occurs, the system freezes all non-shared LSSs first, then freezes all shared LSSs including freezing the key LSS last. Each computing cluster will thaw its unshared volumes without delay after completing all freezes. In one or more embodiments, the multiple independent computing clusters create a shared understanding of which system will thaw the shared LSSs by determining if the key LSS has already been frozen by another system. The last computing cluster to perform the freeze will be the only one to thaw the shared LSSs. This is beneficial since it avoids the possibility of one computing cluster thawing a freeze that the other computing cluster is relying on for data consistency, and minimizes the time to thaw both nonshared LSSs and shared LSSs. Although various embodiments are described herein using two computing clusters, in other embodiments more than two computing clusters may be utilized in a multi-cluster environment.

In a particular embodiment, a method of performing a data consistent freeze of PPRC copy sets in a two sysplex environment to minimize UIT includes freezing all non-shared LSSs as one logical step, and freezing all shared LSSs as a separate logical step. The embodiment further includes determining a collective understanding of which sysplex will perform thaws of shared LSSs by determining, at freeze time, whether the shared LSSs were already frozen by a different sysplex. The embodiment further includes thawing all non-shared volumes, and thawing all shared volumes only on the sysplex that was last to start freeze processing of the shared volumes. In a particular embodiment, the determination of whether the shared volumes were already frozen by another sysplex is performed by a storage controller presenting a unit check status on the freeze I/O. In another particular embodiment, a specific LSS is chosen to be the key logical volume, by choosing the lowest numbered serial number and LSS number combination from the device self-describing data. In another particular embodiment, the determination of shared devices utilizes query host access checking to determine if the storage devices are attached to foreign sysplexes.

In another particular embodiment allowing for more than two sysplexes with each sysplex having access to the same shared LSSs, the collective understanding of which sysplex should perform the thaws of the shared LSSs is performed, after freeze time, by each sysplex disbanding path groups to a peer-to-peer remote copy target key logical volume and subsequently querying path groups to the peer-to-peer remote copy target key logical volume in order to determine if all other sysplexes have already disbanded their path groups. The sysplex that finds no outstanding path groups is determined to be the one to perform the thaws of the shared LSSs. This embodiment further includes each sysplex using Query Host Access as the mechanism to test for the existence of path groups.

With reference now to FIG. 1, FIG. 1 sets forth an example computing environment according to aspects of the present disclosure. Computing environment 100 contains an example of an environment for the execution of at least some of the computer code involved in performing the various methods described herein, such as PPRC freeze processing module 107. In addition to PPRC freeze processing module 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and PPRC freeze processing module 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Such computer processors as well as graphic processors, accelerators, coprocessors, and the like are sometimes referred to herein as a processing device. A processing device and a memory operatively coupled to the processing device are sometimes referred to herein as an apparatus. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in PPRC freeze processing module 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in PPRC freeze processing module 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
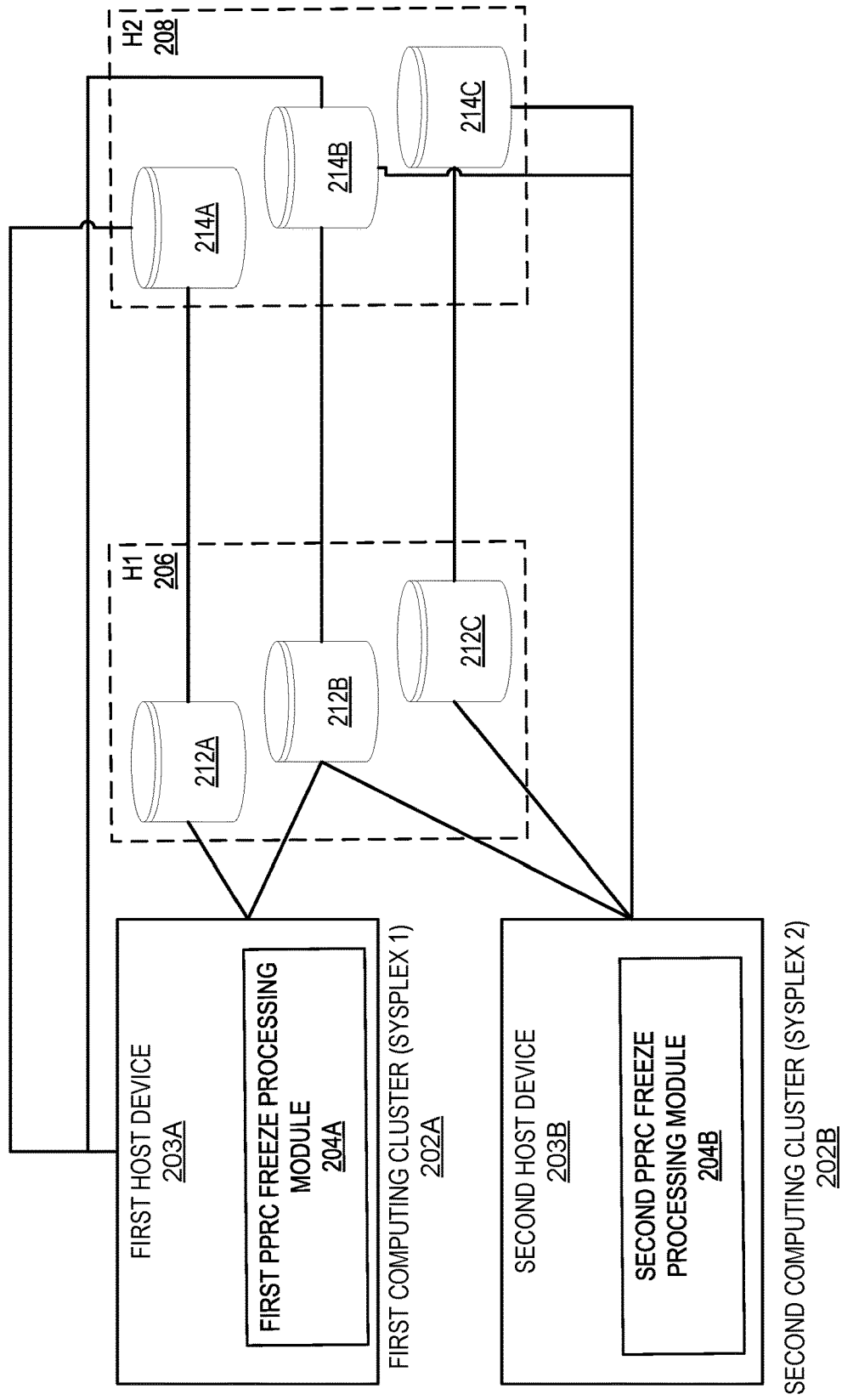
FIG. 2 sets forth another example computing environment according to aspects of the present disclosure.

Referring now to FIG. 2, FIG. 2 sets forth another example computing environment according to aspects of the present disclosure. Computing environment 200 includes a first computing cluster (Sysplex 1) 202A having a first host device 203A and a second computing cluster (Sysplex 2) 202B having a second host device 203B. In a particular embodiment, the first host device 203A and the second host device 203B includes the computer 101 described with respect to FIG. 1. The first host device 203A includes a first PPRC freeze processing module 204A and the second host device 203B include a second PPRC freeze processing module 204B. In a particular embodiment, the first PPRC freeze processing module 204A and the second PPRC freeze processing module 204B includes the PPRC freeze processing module 107 described with respect to FIG. 1.

The first computing cluster 202A and the second computing cluster 202B are each in communication with a set of source storage devices (or volumes) (H1) 206. In a particular embodiment, each of first computing cluster 202A and the second computing cluster 202B are in communication with the set of source storage devices 206 via FICON connections. The set of source storage devices 206 are in communication with a set of target storage devices (or volumes) (H2) 208. In a particular embodiment, the first computing cluster 202A and the second computing cluster 202B are in communication with the set of target storage devices (or volumes) (H2) 208 via, for example, FICON connections. In a particular embodiment, the set of source storage devices 206 are in communication with the set of target storage devices 208 via PPRC connections. In a particular embodiment, the set of source storage devices 206 and the set of target storage devices 208 are located at a different location or site. In one or more embodiments, each of the set of source storage devices 206 and the set of target storage devices 208 include one or more associated storage controllers (not shown).

The set of source storage devices 206 includes source storage devices 212A-212C in which source storage device 212A is a dedicated source storage device for the first computing cluster 202A, the source storage device 212C is a dedicated source storage device for the second computing cluster 202B, and the shared source storage device 212B is a shared source storage device by both the first computing cluster 202A and the second computing cluster 202B. The set of target storage devices 208 includes target storage devices 214A-214C in which target storage device 214A is a dedicated target storage device for the first computing cluster 202A, the target storage device 214C is a dedicated target storage device for the second computing cluster 202B, and the target storage device 214B is a shared target storage device by both the first computing cluster 202A and the second computing cluster 202B. Although various embodiments are illustrated using two computing clusters for simplicity of explanation, in other embodiments more than two computing clusters are used.

In an example operation, an unplanned PPRC suspension event occurs in which the first computing cluster 202A and the second computing cluster 202B are to perform a consistent freeze of the set peer-to-peer remote copy relationships for the source storage devices 206 mirroring to the target storage devices 208. The first computing cluster 202A and the second computing cluster 202B freeze all non-shared LSSs. For example, first computing cluster 202A freezes source storage device 212A and target storage device 214A, and second computing cluster 202B freezes source storage device 212C and target storage device 214C. The first computing cluster 202A and the second computing cluster 202B determine a key LSS from among the shared LSSs based on an identifier associated with the shared LSS such as an LSS with the numerically lowest NED. In a particular embodiment, shared source storage device 212B is determined to be the key LSS.

The first computing cluster 202A and the second computing cluster 202B freeze all of the shared LSSs except for the key LSS, and then freeze the key LSS. In the example operation, the first computing cluster 202A determines the second computing cluster 202B has already frozen the key LSS prior to the first computing cluster 202A freezing the key LSS. The first computing cluster 202A and the second computing cluster 202B thaw their respective nonshared LSSs. Due to being the last computing cluster to freeze the key LSS, the first computing cluster 202A thaws the shared LSSs and the second computing cluster 202B waits for the thaw to complete or a timer to expire. Normal I/O operations then resume for both the first computing cluster 202A and the second computing cluster 202B.

Figure 3:
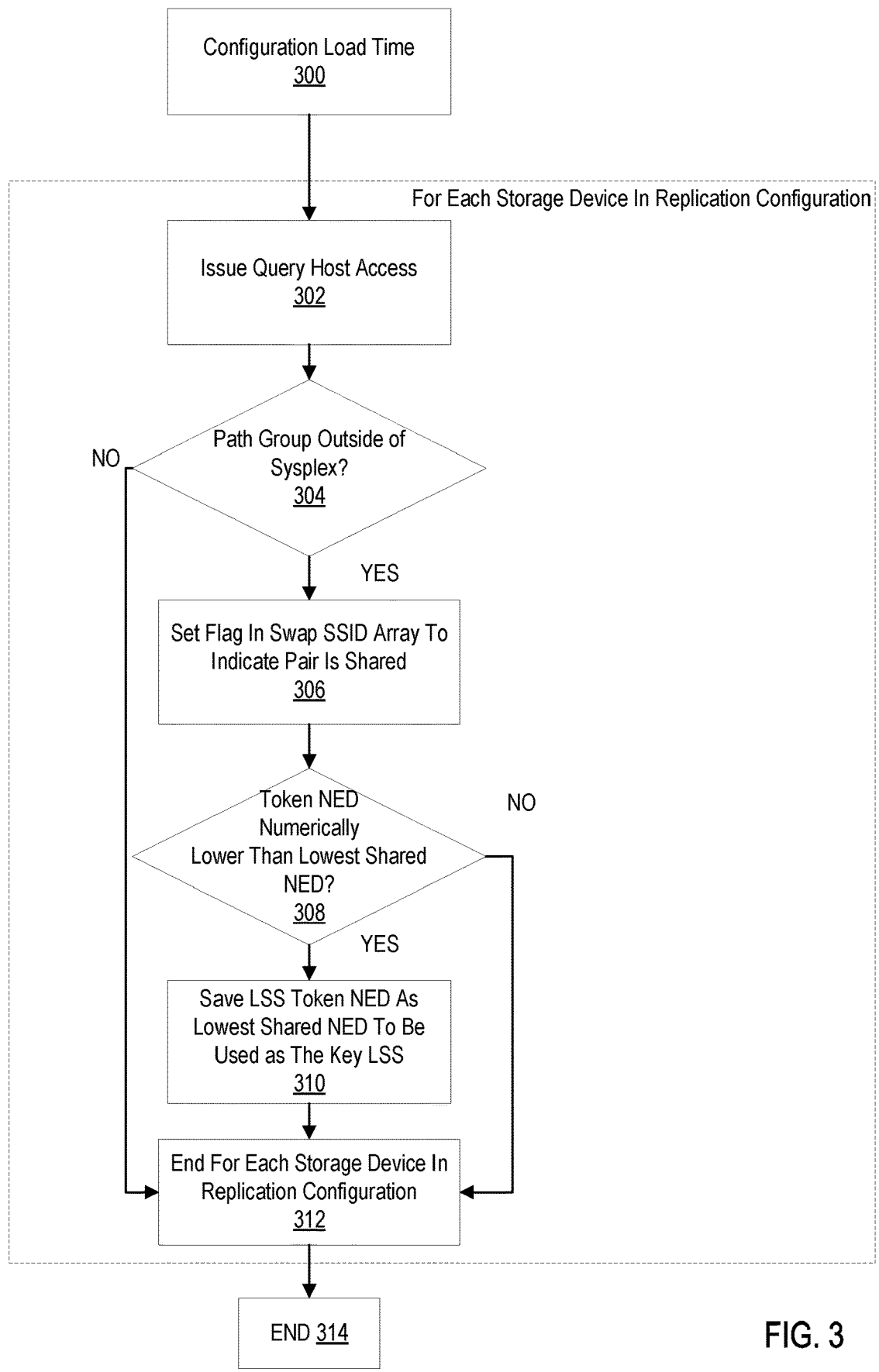
FIG. 3 sets forth a flowchart of an example process for host device load time replication configuration according to aspects of the present disclosure.

Referring now to FIG. 3, FIG. 3 sets forth a flowchart of an example process for host device load time replication configuration according to aspects of the present disclosure. During a configuration load time 300, for each storage device in a replication configuration, the host device issues 302 a Query Host Access command to the storage device to determine the online status and the path group of the storage device. The Query Host Access returns a list of path groups, one for each of the attached systems. For each of the path groups returned from Query Host Access, the host device determines 304 whether the path group of the storage device is outside of the sysplex. If the path group is inside of the sysplex the procedure ends 312 for the storage device. If the path group is outside of the sysplex, the host sets 306 a flag in a subsystem identifier (SSID) array to indicate that a storage device pair is shared. The host device determines 308 whether the token NED for the storage device is numerically lower than the lowest shared NED. If the token NED for the storage device is not lower than the lowest shared NED, the procedure ends 312 for the storage device. If the token NED is numerically lower than the lowest shared NED, the host device saves 310 the LSS token NED as the lowest shard NED to be used as the key LSS and the procedure ends 312 for the storage device. When all storage devices in the replication configuration have been queried, the process ends 314.

Figure 4:
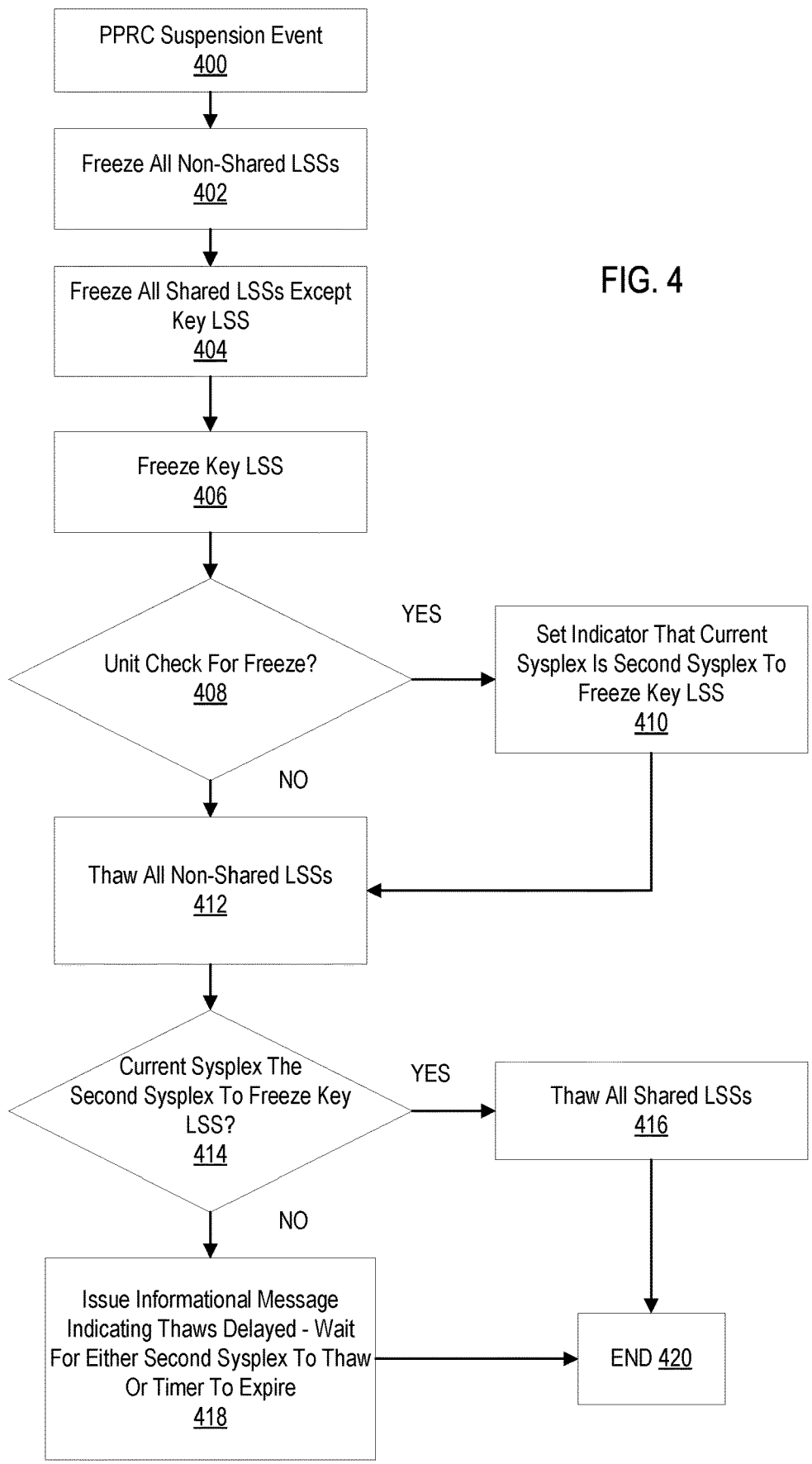
FIG. 4 sets forth a flowchart of an example process for host device peer-to-peer copy suspension event processing according to aspects of the present disclosure.

Referring now to FIG. 4, FIG. 4 sets forth a flowchart of an example process for host device peer-to-peer copy suspension event processing according to aspects of the present disclosure. A PPRC suspension event begins 400 in a two sysplex environment (e.g., the first computing cluster 202A and the second computing cluster 202B, and a host device of a first sysplex freezes 402 all non-shared LSSs. The host device freezes 404 all shared LSSs except the key LSS. The host device the freezes 406 the key LSS. The host device determines 408 if there is a unit check for freeze indicative of the other sysplex having already frozen the key LSS. A unit check is raised by a storage device when there is an exception condition on an I/O request, and the host system performs another I/O called "sense" to read sense data associated with the unit check. In a particular example, the sense data includes 32 bytes. The sense data contains enough information for the host to determine the exception condition. For example, the sense data may include information such as a Format Code, a Message Code, a Reason Code, etc. If a unit check for freeze exists, the host device sets 410 an indicator that the current sysplex is the second sysplex to freeze the key LSS and thaws 412 all non-shared LSSs. If no unit check for freeze exists, the sysplex thaws 412 the non-shared LSSs.

The host device of the sysplex determines 414 whether the current sysplex is the second (i.e., last) sysplex to freeze the key LSS. If the current sysplex was the second sysplex to freeze the key LSS, the host device of the sysplex thaws 416 all shared LSSs and the process ends 420. If the current sysplex was not the second sysplex to freeze the key LSS, the host device issues 418 an informational message indicating that thaws are delayed, and waits for either the second sysplex to thaw or a timer to expire. The process then ends 420.

Figure 5:
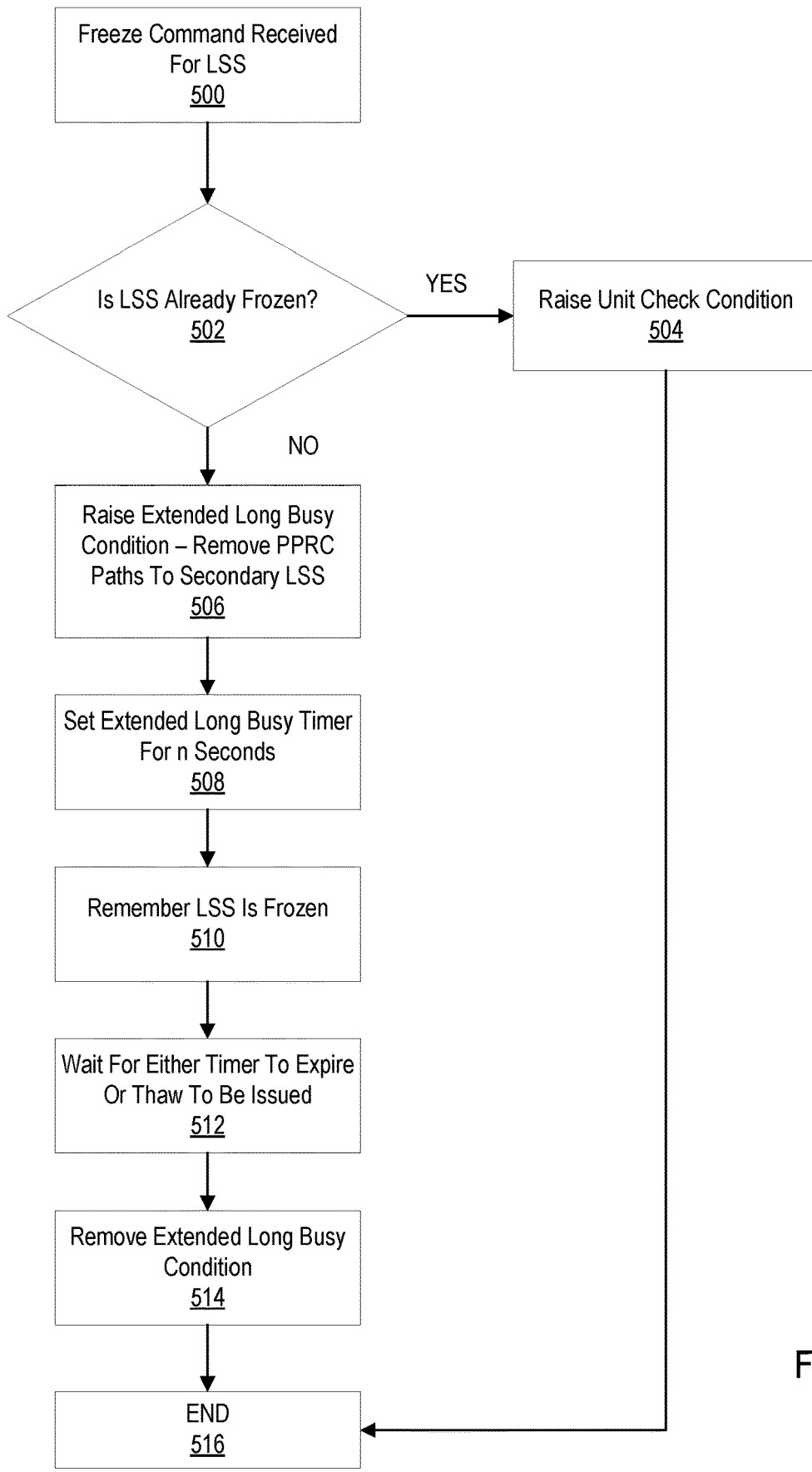
FIG. 5 sets forth a flowchart of an example process for storage controller freeze processing according to aspects of the present disclosure.

Referring now to FIG. 5, FIG. 5 sets forth a flowchart of an example process for storage controller freeze processing according to aspects of the present disclosure. In one or more embodiments, the operations of FIG. 5 are performed by a storage controller of a set of storage devices. The storage controller receives 500 receives a freeze command for the LSS, and determines 502 whether the LSS is already frozen. If the LSS is already frozen, the storage controller raises 504 a unit check condition indicating that the LSS is already frozen, and the process ends 516.

If the LSS is not already frozen, the storage controller raises 506 an extended long busy condition and removes the PPRC paths to the secondary LSS via a freeze. When a primary volume is in the extended long busy condition, it does not allow further write I/O. The storage controller sets 508 an extended long busy timer for a predetermined time such as for n seconds. In a particular embodiment, the extended long busy timer has a default value of 120 seconds.

The storage controller remembers 510 the LSS is frozen, and waits 512 for either the extended long busy timer to expire or for a thaw to be issued. The storage controller removes 514 the extended long busy condition, and the process ends 516.

Figure 6:
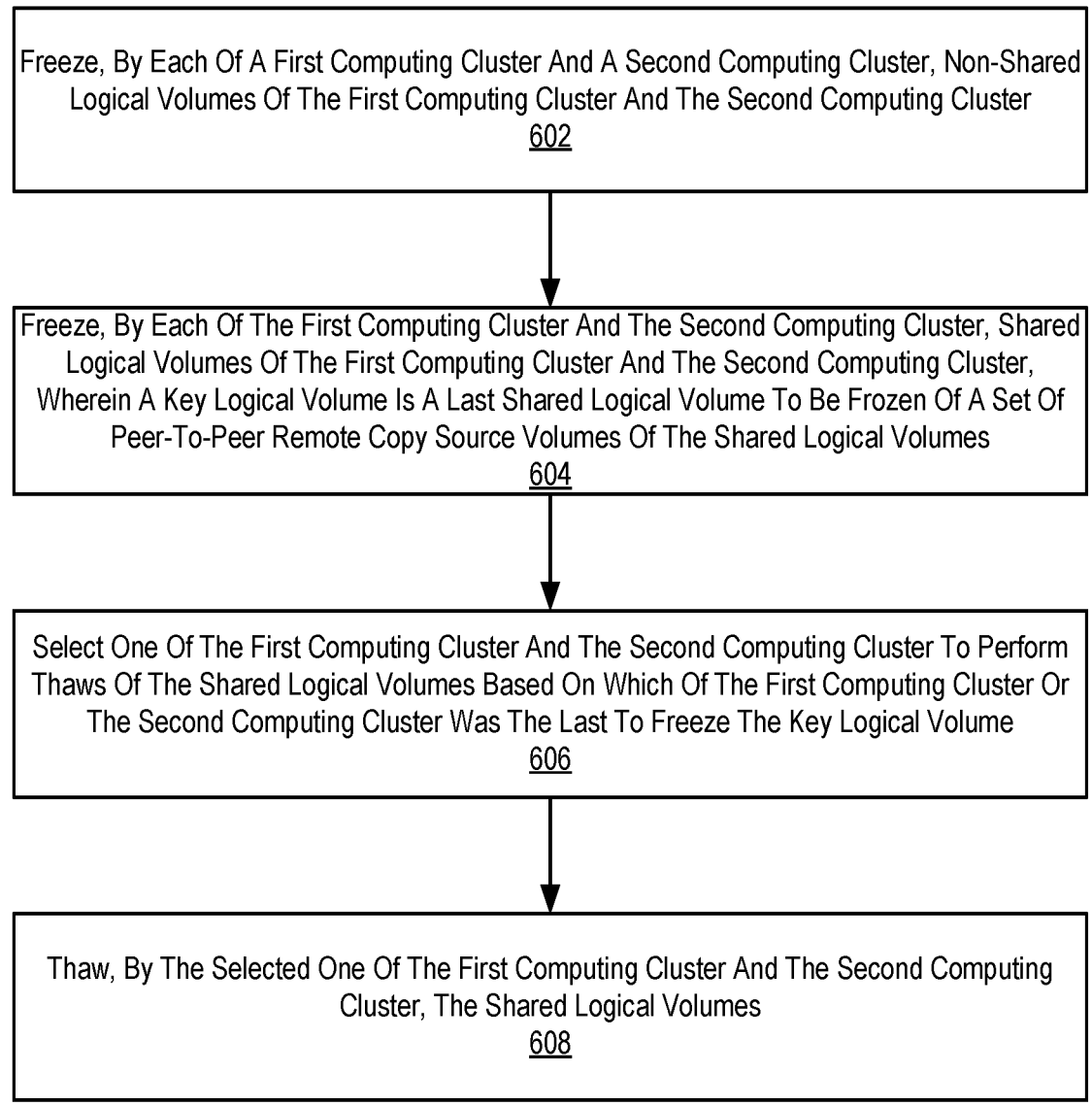
FIG. 6 sets forth a flowchart of an example process for data consistent freeze of peer-to-peer remote copy in a multiple computing cluster environment according to aspects of the present disclosure.

Referring now to FIG. 6, FIG. 6 sets forth a flowchart of an example process for data consistent freeze of peer-to-peer remote copy in a multiple computing cluster environment according to aspects of the present disclosure. The process includes freezing 602, by each of a first computing cluster and a second computing cluster, non-shared logical volumes of the first computing cluster and the second computing cluster. The process further includes freezing 604, by each of the first computing cluster and the second computing cluster, all shared logical volumes of the first computing cluster and the second computing cluster, wherein a key logical volume is a last shared logical volume to be frozen of a set of peer-to-peer remote copy source volumes of the shared logical volumes.

The process of FIG. 6 further includes selecting 606 one of the first computing cluster and the second computing cluster to perform thaws of the shared logical volumes based on which of the first computing cluster or the second computing cluster was the last to freeze the key logical volume. The process further includes thawing, by the selected one of the first computing cluster and the second computing cluster, the shared logical volumes.

Figure 7:
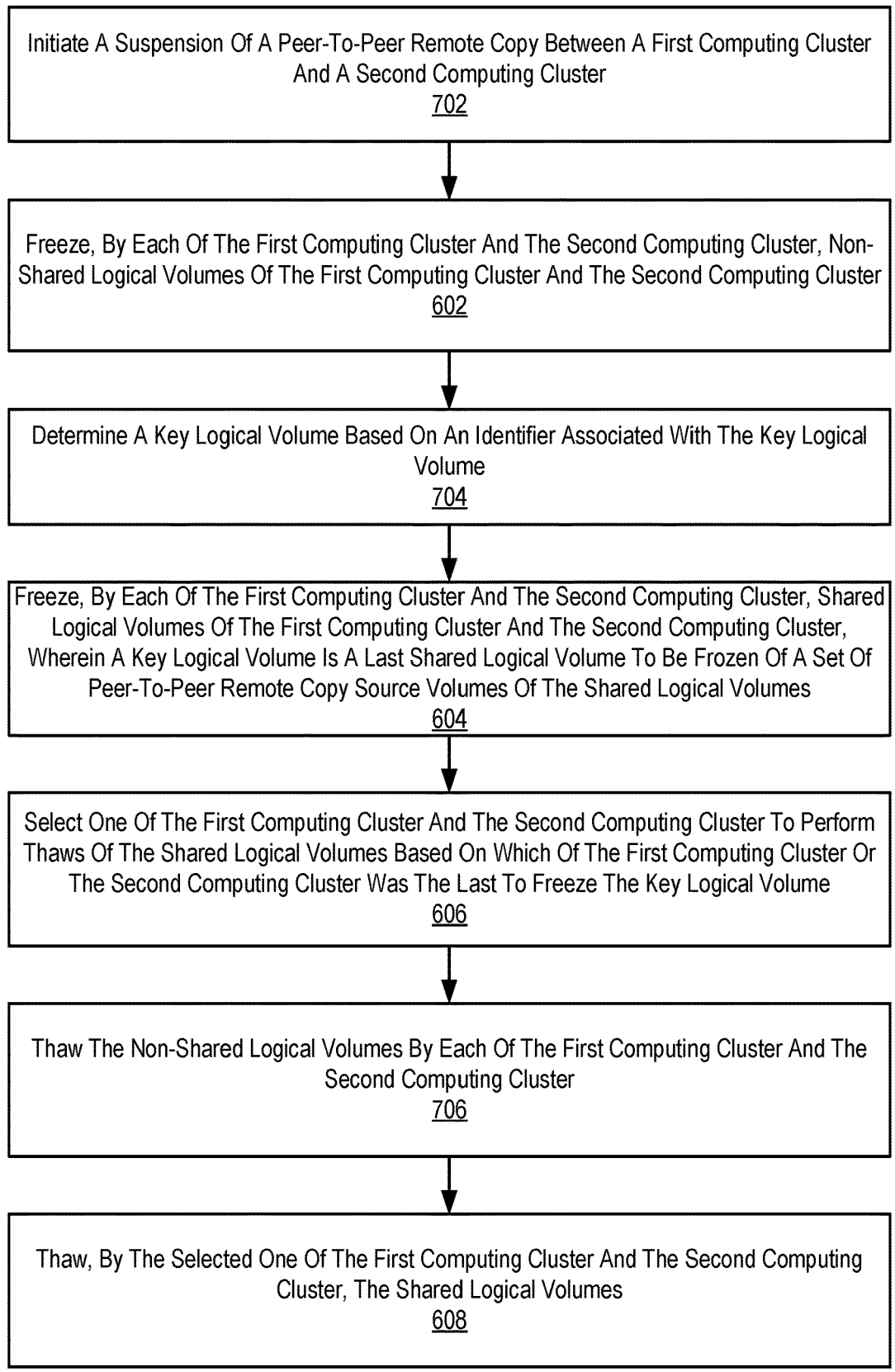
FIG. 7 sets forth a flowchart of another example process for data consistent freeze of peer-to-peer remote copy in a multiple computing cluster environment according to aspects of the present disclosure.

Referring now to FIG. 7, FIG. 7 sets forth a flowchart of another example process for data consistent freeze of peer-to-peer remote copy in a multiple computing cluster environment according to aspects of the present disclosure. The process of FIG. 7 is similar to the process described with respect to FIG. 6 and further includes initiating 702 a suspension of a peer-to-peer remote copy between a first computing cluster and a second computing cluster prior to the freezing 602 of the non-shared logical volumes of the first computing cluster and the second computing cluster.

The process of FIG. 7 further includes determining 704 the key logical volume based on an identifier associated with the key logical volume. In a particular embodiment, the identifier is a numerical identifier. In another particular embodiment, the numerical identifier of the key logical volume has a lowest value from among numerical identifiers associated with each of the shared logical volumes. In another particular embodiment, the numerical identifier comprises a Node Element Descriptor (NED). The process of FIG. 7 further includes thawing 706 the non-shared logical volumes by each of the first computing cluster and the second computing cluster. In a particular embodiment, the thawing of the non-shared logical volumes is performed prior to the thawing 608 of the shared logical volumes.

Although various embodiments have been described with respect to two computing clusters, other embodiments include more than two computing clusters. In an example including three computing clusters, if a given computing cluster receives the unit check on the freeze, the computing cluster cannot determine if it is the second or third computing cluster to perform the freeze, only that it is not the first computing cluster to perform the freeze.

In an embodiment having two or more computing clusters, each system in each computing cluster registers a Path Group ID with each storage device. The Path Group ID is a unique string that may be used to identify the computing cluster from which it was received. With an example including three computing clusters, there are Path Group IDs for each of the systems in the three computing clusters. The storage controller utilizes the Path Group ID information to keep track of which storage devices are being used by each host system. In the embodiment, the process of establishing Path Group IDs is performed using a "Set Path Group ID" command with option flags set to "Establish Group". Similarly, to disband the Path Group IDs, the "Set Path Group ID" command is used with different option flags including a "Disband Group" option flag. After the disband of the Path Group ID is performed by a given host system, the corresponding path group for the host system is removed from the storage device.

In the embodiment, each host system disbands the path group for itself on the target storage devices after performing the freeze I/O on the key logical volume. Immediately after, each host queries the target storage devices using a Query Host Access command to check for any path groups. If there are any path groups, it must be the case that at least one other computing cluster has not progressed far enough to disband its path groups. If there are no more path groups, the computing cluster considers itself to be the last one to complete the freezes. The computing cluster will then perform the thaws of the shared LSSs. In a particular example, two or more computing clusters may consider themselves as the last computing cluster to freeze. In such situations, the process continues to function properly due to the fact that all computing clusters have completed the freeze.

Figure 8:
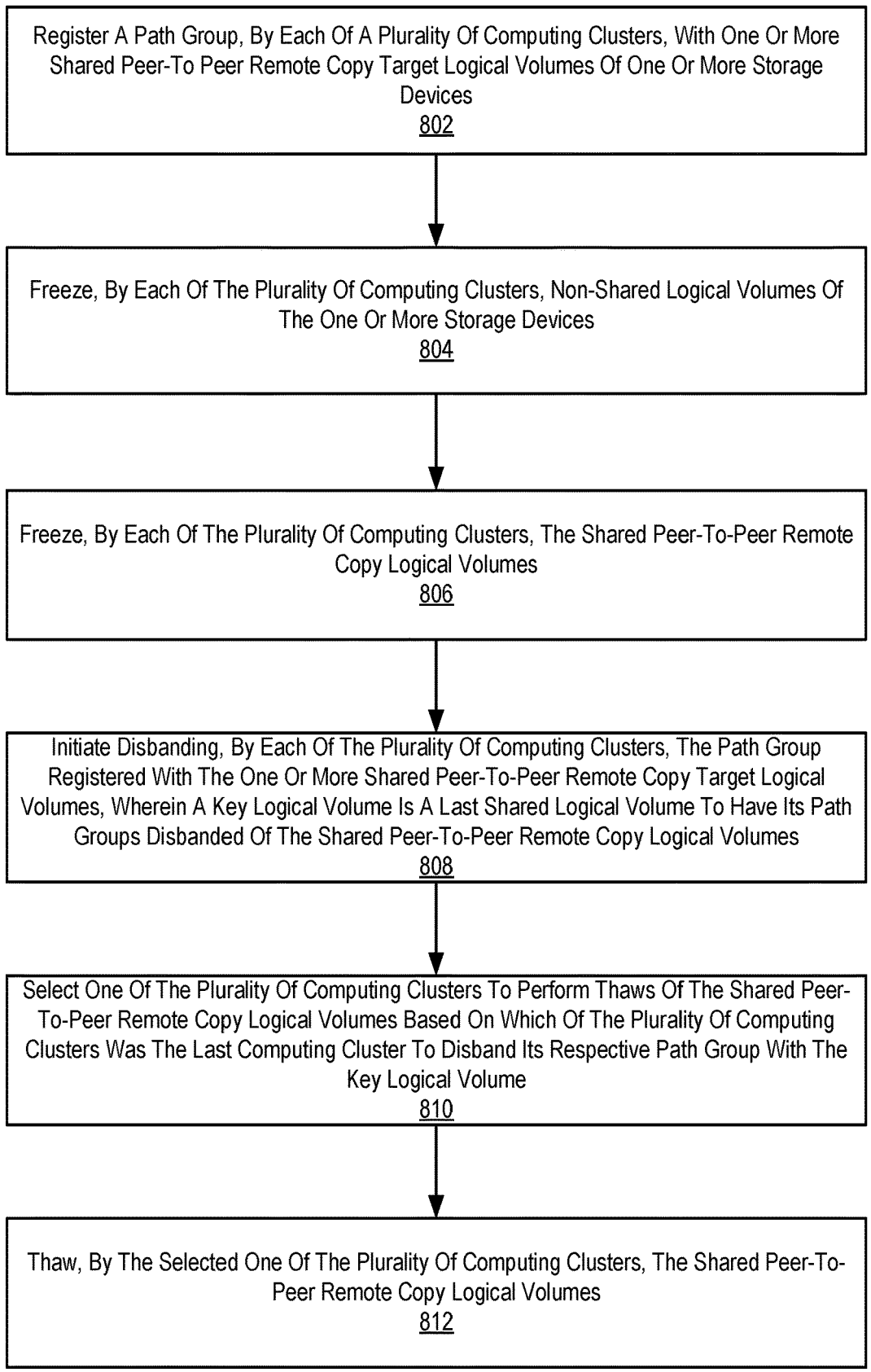
FIG. 8 sets forth a flowchart of another example process for data consistent freeze of peer-to-peer remote copy in a multiple computing cluster environment according to aspects of the present disclosure.

FIG. 8 sets forth a flowchart of another example process for data consistent freeze of peer-to-peer remote copy in a multiple computing cluster environment according to aspects of the present disclosure. The process includes registering 802 a path group, by each of a plurality of computing clusters, with one or more shared peer-to-peer remote copy target logical volumes of one or more storage devices. The process further includes freezing 804, by each of the plurality of computing clusters, non-shared logical volumes of the one or more storage devices. The process further includes freezing 806, by each of the plurality of computing clusters, the shared peer-to-peer remote copy logical volumes.

The process further includes initiating disbanding 808, by each of the plurality of computing clusters, the path group registered with the one or more shared peer-to-peer remote copy target logical volumes. A key logical volume is a last shared logical volume to have its path groups disbanded of the shared peer-to-peer remote copy logical volumes. The process further includes selecting 810 one of the plurality of computing clusters to perform thaws of the shared LSSs based on which of plurality of computing clusters was the last computing cluster to disband its respective path group with the key logical volume. In a particular embodiment, selecting 810 one of the plurality of computing clusters to perform thaws of the shared peer-to-peer remote copy logical volumes based on which of plurality of computing clusters was the last computing cluster to disband its respective path group with the key logical volume further includes disbanding, by each of the plurality of computing clusters, its respective path group to the key logical volume; and querying, by each of the plurality of computing clusters subsequent to the disbanding, the key logical volume to determine if the computing cluster is the last of the plurality of computing clusters to disband its respective path group with the key logical volume.

The process further includes thawing 812, by the selected one of the plurality of computing clusters, the shared peer-to-peer remote copy logical volumes. In a particular embodiment, the process further includes thawing the non-shared logical volumes by each of the plurality of computing clusters. In a particular embodiment, the thawing of the non-shared logical volumes is performed prior to the thawing of the shared logical volumes.

In an embodiment, the process further includes determining the key logical volume based on an identifier associated with the key logical volume. In a particular embodiment, the identifier is a numerical identifier. In another particular embodiment, the numerical identifier of the key logical volume has a lowest value from among numerical identifiers associated with each of the shared logical volumes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   freezing, by each of a first computing cluster and a second computing cluster, non-shared logical volumes of the first computing cluster and the second computing cluster;
   freezing, by each of the first computing cluster and the second computing cluster, shared logical volumes of the first computing cluster and the second computing cluster, wherein a key logical volume is a last shared logical volume to be frozen of a set of peer-to-peer remote copy source volumes of the shared logical volumes;
   selecting one of the first computing cluster and the second computing cluster to perform thaws of the shared logical volumes based on which of the first computing cluster or the second computing cluster was the last to freeze the key logical volume; and
   thawing, by the selected one of the first computing cluster and the second computing cluster, the shared logical volumes.

2. The method of claim 1, further comprising initiating a suspension of a peer-to-peer remote copy between the first computing cluster and the second computing cluster prior to the freezing of the non-shared logical volumes of the first computing cluster and the second computing cluster.

3. The method of claim 1, further comprising:
   thawing the non-shared logical volumes by each of the first computing cluster and the second computing cluster.

4. The method of claim 3, wherein the thawing of the non-shared logical volumes is performed prior to the thawing of the shared logical volumes.

5. The method of claim 1, further comprising determining the key logical volume based on an identifier associated with the key logical volume.

6. The method of claim 5, wherein the identifier is a numerical identifier.

7. The method of claim 6, wherein the numerical identifier of the key logical volume has a lowest value from among numerical identifiers associated with each of the shared logical volumes.

8. The method of claim 6, wherein the numerical identifier comprises a Node Element Descriptor (NED).

9. A method comprising:
   registering a path group, by each of a plurality of computing clusters, with one or more shared peer-to-peer remote copy target logical volumes of one or more storage devices;
   freezing, by each of the plurality of computing clusters, non-shared logical volumes of the one or more storage devices;
   freezing, by each of the plurality of computing clusters, the shared peer-to-peer remote copy logical volumes;
   initiating disbanding, by each of the plurality of computing clusters, the path group registered with the one or more shared peer-to-peer remote copy target logical volumes, wherein a key logical volume is a last shared logical volume to have its path groups disbanded of the shared peer-to-peer remote copy volumes;
   selecting one of the plurality of computing clusters to perform thaws of the shared peer-to-peer remote copy logical volumes based on which of plurality of computing clusters was the last computing cluster to disband its respective path group with the key logical volume; and thawing, by the selected one of the plurality of computing clusters, the shared peer-to-peer remote copy logical volumes.

10. The method of claim 9, wherein selecting one of the plurality of computing clusters to perform thaws of the shared peer-to-peer remote copy logical volumes based on which of plurality of computing clusters was the last computing cluster to disband its respective path group with the key logical volume further comprises:

disbanding, by each of the plurality of computing clusters, its respective path group to the key logical volume; and querying, by each of the plurality of computing clusters subsequent to the disbanding, the key logical volume to determine if the computing cluster is the last of the plurality of computing clusters to disband its respective path group with the key logical volume.

11. The method of claim 9, further comprising:

thawing the non-shared logical volumes by each of the plurality of computing clusters.

12. The method of claim 11, wherein the thawing of the non-shared logical volumes is performed prior to the thawing of the shared peer-to-peer remote copy logical volumes.

13. The method of claim 9, further comprising determining the key logical volume based on an identifier associated with the key logical volume.

14. The method of claim 13, wherein the identifier is a numerical identifier.

15. The method of claim 14, wherein the numerical identifier of the key logical volume has a lowest value from among numerical identifiers associated with each of the shared peer-to-peer remote copy logical volumes.

16. An apparatus comprising:

a processing device; and memory operatively coupled to the processing device, wherein the memory stores computer program instructions that, when executed, cause the processing device to:

freeze, by each of a first computing cluster and a second computing cluster, non-shared logical volumes of the first computing cluster and the second computing cluster;

freeze, by each of the first computing cluster and the second computing cluster, shared logical volumes of the first computing cluster and the second computing cluster, wherein a key logical volume is a last shared logical volume to be frozen of a set of peer-to-peer remote copy source volumes of the shared logical volumes;

select one of the first computing cluster and the second computing cluster to perform thaws of the shared logical volumes based on which of the first computing cluster or the second computing cluster was the last to freeze the key logical volume; and thaw, by the selected one of the first computing cluster and the second computing cluster, the shared logical volumes.

17. The apparatus of claim 16, wherein the memory stores computer program instructions that, when executed, cause the processing device to initiate a suspension of a peer-to-peer remote copy between the first computing cluster and the second computing cluster prior to the freezing of the non-shared logical volumes of the first computing cluster and the second computing cluster.

18. The apparatus of claim 16, wherein the memory stores computer program instructions that, when executed, cause the processing device to thaw the non-shared logical volumes by each of the first computing cluster and the second computing cluster.

19. The apparatus of claim 16, wherein the thawing of the non-shared logical volumes is performed prior to the thawing of the shared logical volumes.

20. The apparatus of claim 16, wherein the memory stores computer program instructions that, when executed, cause the processing device to determine the key logical volume based on an identifier associated with the key logical volume.

* * * * *